United States Patent [19]

Umemoto et al.

[11] Patent Number: 5,636,323
[45] Date of Patent: Jun. 3, 1997

[54] SPEECH COMMUNICATION APPARATUS HAVING AN ECHO CANCELER

[75] Inventors: Yuji Umemoto, Hachiouji; Koki Otsuka, Hino, both of Japan

[73] Assignee: Kabushiki Kaisha Toshiba, Japan

[21] Appl. No.: 302,889

[22] PCT Filed: Jan. 10, 1994

[86] PCT No.: PCT/JP94/00017

§ 371 Date: Sep. 19, 1994

§ 102(e) Date: Sep. 19, 1994

[87] PCT Pub. No.: WO94/17603

PCT Pub. Date: Aug. 4, 1994

[30] Foreign Application Priority Data

Jan. 20, 1993 [JP] Japan ........................... 5-7494

[51] Int. Cl.⁶ .................................................. G10L 3/02
[52] U.S. Cl. ........................ 395/2.35; 379/58; 379/406; 379/410; 381/94
[58] Field of Search ........................ 395/2.34–2.37; 381/46, 47, 73.1, 94, 101, 102, 104, 111, 120, 122; 379/58, 185, 406, 410, 420

[56] References Cited

U.S. PATENT DOCUMENTS

| 5,099,472 | 3/1992 | Townsend et al. ........... 379/390 |
| 5,131,032 | 7/1992 | Esaki et al. ................. 379/406 |
| 5,247,512 | 9/1993 | Sugaya et al. ............... 379/410 |

FOREIGN PATENT DOCUMENTS

| 59-90434 | 5/1984 | Japan ........................... H04B 3/23 |
| 2-125534 | 5/1990 | Japan ........................... H04B 3/23 |
| 3-16438 | 1/1991 | Japan ........................... H04B 10/08 |

OTHER PUBLICATIONS

Japanese Search Report for International Application No. PCT/JP94/00017.

*Primary Examiner*—Kee M. Tung
*Attorney, Agent, or Firm*—Banner & Witcoff, Ltd.

[57] ABSTRACT

The invention is directed to an apparatus for speech communication that includes an echo canceler (3) for canceling an acoustic echo component input from a hands-free speech loudspeaker (13) to a microphone (14). The echo canceler (30) is provided with a volume control (36) for variably controlling the volume of a received speech signal, an amplitude limiter (35) for limiting the amplitude of an output signal from the volume control (36), an echo canceler (32, 32) for estimating a pseudo echo signal from an output from the amplitude limiter and subtracting the estimated pseudo echo signal from the transmitted speech signal input from the microphone (14), and a nonlinear filter (34) for processing an output from the echo canceler, thereby limiting the amplitude level of the received speech signal to a predetermined level or less. Accordingly, even if a received speech signal having a high received speech signal level is input to the echo canceler, the received speech is not distorted, and an acoustic echo can be sufficiently canceled by the echo canceler.

14 Claims, 6 Drawing Sheets

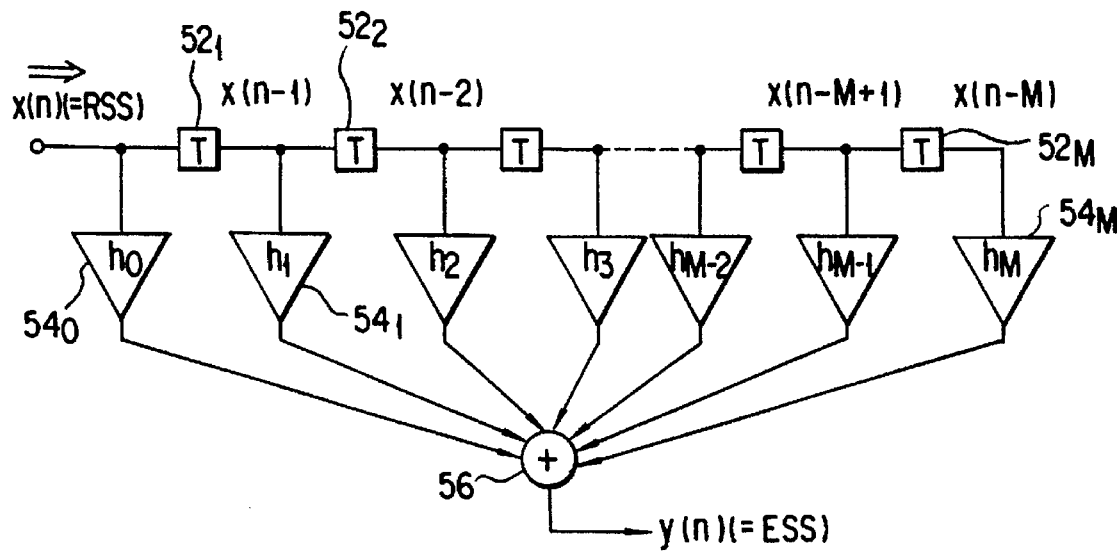
F I G. 3
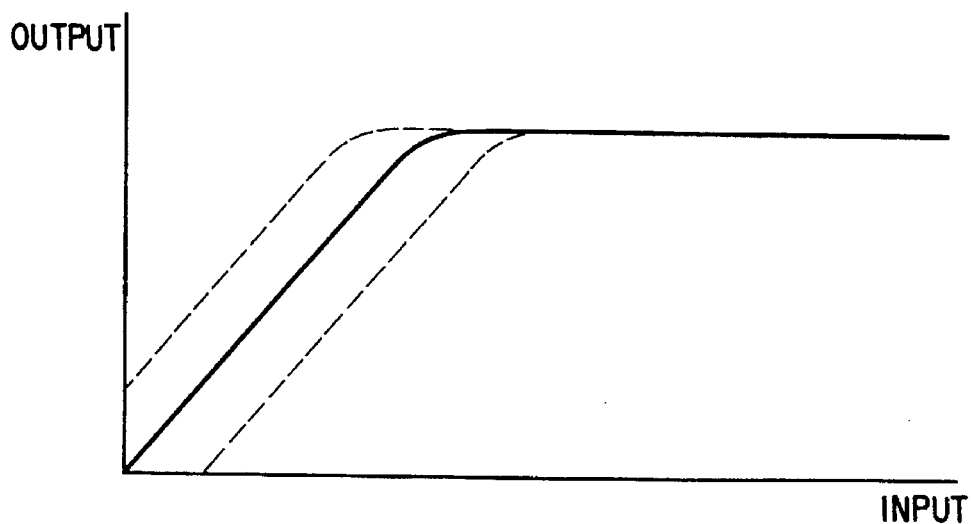
F I G. 4

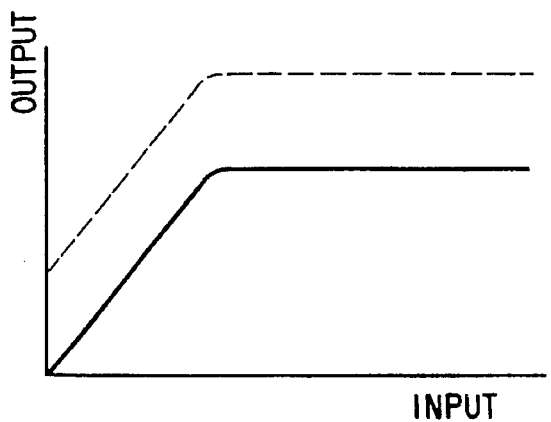
F I G. 6A
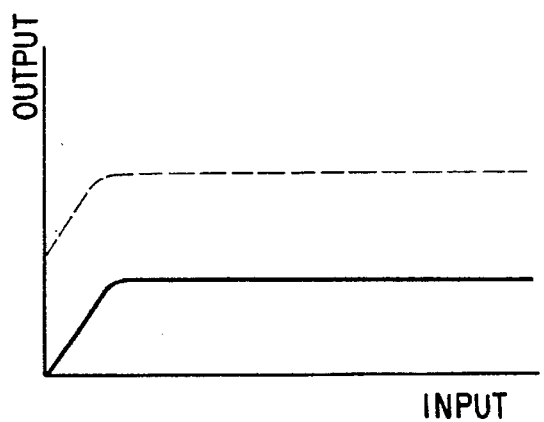
F I G. 6B
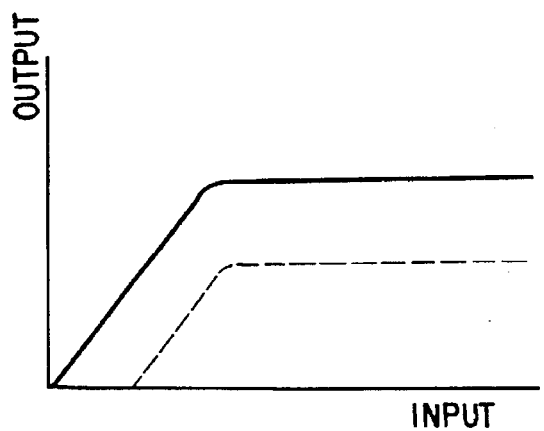
F I G. 7A
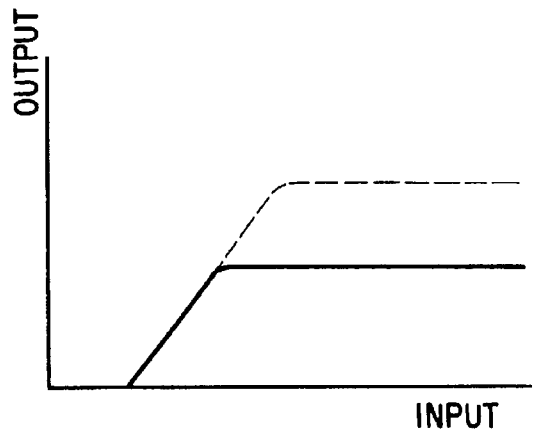
F I G. 7B

SPEECH COMMUNICATION APPARATUS HAVING AN ECHO CANCELER

TECHNICAL FIELD

The present invention relates to a speech communication apparatus having an echo canceler for canceling acoustic echoes generated during hands-free speech as in a mobile telephone apparatus.

BACKGROUND ART

Of all radio telephone sets mounted in vehicles, such as a mobile telephone apparatus, an apparatus has a hands-free speech mode in addition to a handset talking mode. The hands-free speech mode is a mode in which a receiving speech loudspeaker and a transmitting speech microphone are arranged in a telephone apparatus body or a dashboard independently of a handset, and the loudspeaker and the microphone constitute a handset to perform talking. In this hands-free speech mode, a speaker can speak without holding a handset. The speaker can safely speak without having to hold the steering wheel with a single hand even during driving. The hands-free speech mode is very useful to improve safety during driving.

In such a hands-free speech mode, however, a received speech output from the loudspeaker is input to the microphone during talking to produce an acoustic echo. This echo signal is often transmitted to the partner side. Therefore, an echo canceler for canceling the above echo signal is generally arranged in a telephone apparatus having such a hands-free speech mode. In a radio telephone apparatus for encoding a speech signal into digital data and transmitting the digital data, the echo canceler is inevitably used because signal delays caused by a speech encoding/decoding circuit (speech codec) and an error correction encoding/decoding circuit (channel codec) are large so that the acoustic echoes bother the speaker.

A conventional acoustic echo canceler comprises a digital signal processor. This processor comprises arithmetic operation means for simulating acoustic characteristics of an echo path from the loudspeaker to the microphone, subtracting means for obtaining a difference between an output from the arithmetic operation means and an input from the microphone, and means for changing the acoustic characteristics of the arithmetic operation means such that the output from the subtracter becomes zero. In this processor, a speech signal supplied to the loudspeaker is supplied to the arithmetic operation means to generate a pseudo acoustic echo, and this pseudo acoustic echo is subtracted from an actual transmitting speech signal (containing the acoustic echo) transmitted from the microphone, thereby canceling the acoustic echo. An output from the subtracter is deviated from zero in accordance with a change in acoustic characteristics of the echo path. However, when the coefficient of the arithmetic operation means is changed such that the output from the subtracter becomes zero, the acoustic echo signal can always be canceled.

The following problem to be solved is left in a conventional speech communication apparatus having such an echo canceler. A volume control is inserted in the receiving speech signal path of the speech communication apparatus. A speaker operates this volume control to adjust the receiving speech volume. When the receiving speech volume is set excessively high upon operation of the volume control, the signal level of a receiving speech signal exceeds the dynamic ranges of a receiving speech amplifier and a loudspeaker, thereby distorting received speech. When the received speech produced from the loudspeaker is distorted, an echo signal having distortion corresponding to the distortion of the received speech is also input to the microphone. As a result, the echo canceler cannot sufficiently cancel the echo signal.

Even if the volume control is adjusted so as to obtain an optimal receiving speech volume, the receiving speech signal level may be temporarily increased due to a small loss of the wired line of the partner or a change in loudness of the partner's voice. In this case, the received Speech is distorted, and the distorted echo may not be canceled.

The above description have exemplified the hands-free speech mode. However, even in the handset talking mode, when the handset is kept away from a face, speech received from the receiver may be input to the microphone, and an acoustic echo signal may be generated. That is, the above problem is not limited to the hands-free speech mode. In addition, the above problem is not limited to a mobile telephone apparatus, but is equally applicable to a wired telephone apparatus, a radio communication machine, and a transceiver, and the like.

The present invention has been made in consideration of the above situation, and has as its object to cause an echo canceler to sufficiently cancel an acoustic echo even if the signal level of a receiving speech signal exceeds the dynamic ranges of a receiving speech amplifier and a loudspeaker in a speech communication apparatus having the echo canceler for canceling an acoustic echo contained in a transmitted signal by estimating an echo path of the received signal, thereby further improving talking quality.

DISCLOSURE OF INVENTION

In order to achieve the above object of the present invention, there is provided a speech communication apparatus characterized by comprising transceiver means for transmitting and receiving speech, loudspeaker means for outputting the speech received by the transceiver means, microphone means for inputting transmitted speech, means, connected between the loudspeaker means and the transceiver means and between the microphone means and the transceiver means, for canceling an acoustic echo generated upon inputting the received speech output from the loudspeaker means to the microphone means, and means for limiting, to a predetermined value, an amplitude of a receiving speech signal input to the echo canceling means, the amplitude being the predetermined value or more.

According to the present invention, there is also provided a speech communication apparatus in which means for adjusting a volume of the receiving speech signal is connected to an output side of the amplitude limiting means, wherein a decrease/increase in amplitude limit level is performed by the amplitude limiting means in association with an increase/decrease of a volume of the amplitude limiting means.

BRIEF DESCRIPTION OF DRAWINGS

FIG. 3 is a circuit block diagram showing the main part of the echo canceler shown in FIG. 2;

FIG. 4 is a graph for explaining an operation according to the first embodiment;

FIGS. 6A and 6B are graphs for explaining an operation according to the second embodiment;

FIGS. 7A and 7B are graphs for explaining another operation according to the second embodiment.

BEST MODE OF CARRYING OUT THE INVENTION

Embodiments of a speech communication apparatus according to the present invention will be described below with reference to the accompanying drawings.

Figure 1:
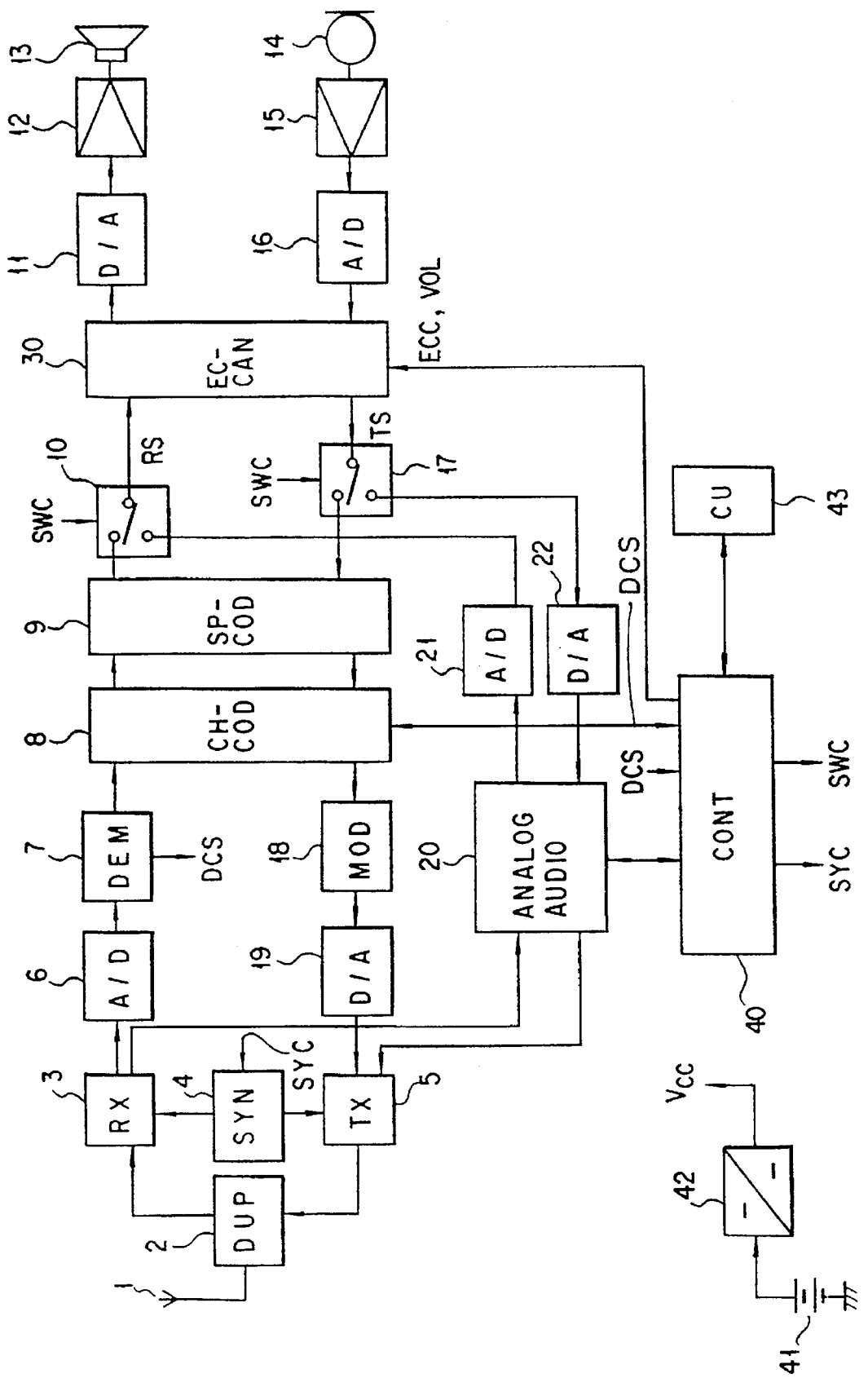
FIG. 1 is a circuit block diagram showing the arrangement of a so-called dual mode radio telephone apparatus according to a first embodiment of the present invention.

FIG. 1 is a circuit block diagram showing the arrangement of a dual mode radio telephone apparatus according to the first embodiment of the speech communication apparatus of the present invention. A dual mode is defined as a scheme for selectively using an analog mode and a digital mode. The analog mode is defined as a scheme in which a transmitter apparatus, e.g., FM-modulates a carrier with an analog speech signal and data, and transmits the speech signal and data, and a receiver apparatus receives the modulated carrier sent from the transmitter apparatus and FM-demodulates the received signal and data to reproduce the analog speech signal and data. The digital mode is defined as a scheme in which a transmitter apparatus encodes a speech signal and data, digitally modulates a carrier with the encoded signal in accordance with, e.g., a ρ/4 shifted DQPSK (ρ/4 shifted, differentially encoded quadrature phase shift keying) scheme, and transmits the digitally modulated wave, and a receiving apparatus receives the modulated wave sent from the transmitter apparatus, digitally demodulates the digitally modulated wave, and decodes the demodulated signal, thereby reproducing the speech signal and data.

A radio frequency signal sent from a base station (not shown) through a digital or analog talking channel is received by an antenna 1 and input to a reception circuit (RX) 3 through an antenna duplexer (DUP) 2. In this embodiment, the antenna 1 can be used as either a reception or transmission antenna. The antenna 1 is switched by the duplexer 2 and serves either the reception or transmission antenna. The radio frequency signal is mixed with a reception local oscillation signal output from a frequency synthesizer (SYN) 4 to frequency-modulate it into an intermediate frequency signal. The frequency of the reception local oscillation signal generated by the frequency synthesizer 4 is controlled by a control signal SYC output from a control circuit 40. When the radio frequency signal is received through the digital talking channel, the reception circuit 3 converts the intermediate frequency signal into a digital signal through an A/D converter 6, and the digital signal is supplied to a digital demodulator (DEM) 7. However, when the reception circuit 3 receives the radio frequency signal through the analog talking channel, the reception circuit 3 supplies the intermediate frequency signal to an analog audio circuit (ANALOG AUDIO) 20.

In the digital demodulator 7, the received intermediate frequency signal is converted into a digital baseband signal. The digital baseband signal output from the digital demodulator 7 contains the digital receiving speech signal and the digital control signal. The digital receiving speech signal is input to an error correction encoding/decoding circuit (CH-COD) 8. The error correction encoding/decoding circuit 8 performs error correction decoding of the digital receiving speech signal supplied from the digital demodulator 6, so that an error-corrected digital receiving speech signal is input to a speech encoding/decoding circuit (SP-COD) 9. A digital control signal DCS is input from the digital demodulator 7 and the error correction demodulator 8 to the control circuit 40 and is identified. The speech encoding/decoding circuit 9 performs the speech decoding process of the digital receiving speech signal. A digital receiving speech signal RS output from the speech encoding/decoding circuit 9 is input to an echo canceler (EC-CAN) 30 through a switching circuit 10.

Meanwhile, the received intermediate frequency signal input to the analog audio circuit 20 is FM-modulated, and the speech level of the FM-modulated signal is amplified. An analog baseband talking signal output from the analog speech circuit 20 is temporarily converted into a digital signal by an A/D converter 21. The converted signal is input to the echo canceler 30 as the digital receiving speech signal RS.

Part of the digital receiving speech signal RS is received by the echo canceler 30. After a digital receiving speech signal output from an echo canceler is converted into an analog receiving speech signal by a D/A converter 11, the converted signal is amplified by a receiving speech amplifier 12, and the amplified signal is supplied to a loudspeaker 13, thereby producing amplified speech from the loudspeaker 13.

A speaker's transmitting speech signal input to a microphone 14 is amplified by a transmitting speech amplifier 15, and the amplified signal is converted into a digital transmitting speech signal by an A/D converter 16. The digital signal is then input to the echo canceler 30. The echo canceler 30 performs a process for canceling an acoustic echo contained in the digital transmitting speech signal. The details of the process will be described later with reference to FIG. 2.

A digital transmitting speech signal TS output from the echo canceler 30 is input to the speech encoding/decoding circuit 9 through a switching circuit 17 if the transmitting speech channel is a digital channel. However, when the transmitting speech channel is an analog channel, a transmitting speech signal is input to the analog audio circuit 20 through a D/A converter 22 and the switching circuit 17.

The speech encoding/decoding circuit 9 performs the speech encoding process of the digital transmitting speech signal. A digital transmitting speech signal output from the speech encoding/decoding circuit 9 is input to the error correction decoding circuit 8 together with the digital control signal output from the control circuit 40. The error correction encoding/decoding circuit 8 performs the error correction encoding process of the digital transmitting speech signal and the digital control signal. The coded digital transmitting speech signal is input to a digital modulator (MOD) 18. In the digital modulator 18, a signal modulated by ρ/4 shifted DQPSK in accordance with the digital transmitting speech signal is generated, and the modulated signal is converted into an analog signal by a D/A converter 19. The resultant analog signal is input to a transmission circuit (TX) 5.

In the analog audio circuit 20, an FM-modulated signal corresponding to the transmitting speech signal is generated and is input to the transmission circuit 5.

In the transmission circuit 5, the input modulated signal is mixed with the transmission local oscillation circuit corresponding to a talking channel radio frequency generated by the frequency synthesizer 4 and is converted into a radio transmission signal. The radio transmission signal is also RF-amplified. A radio transmission signal output from the transmission circuit 5 is supplied to the antenna 1 through the antenna duplexer 2 and is transmitted from the antenna 1 to a base station (not shown).

The switching operations of the switching circuits 10 and 17 are controlled by a switching control signal SWC output from the control circuit 40. The switching control signal is switched in accordance with the digital or analog mode.

The control circuit 40 has, e.g., a microcomputer serving as a main controller. The control circuit is connected to a console unit (CU) 43. The console unit 43 includes key switches and a display. The display comprises, e.g., a liquid crystal display. The key switches comprise a transmission key, an end key, a dial key, a mode designation key, and a volume control key. Of these keys, the mode designation key is used to allow a user to selectively input and designate the analog mode, the digital mode, or a dual mode which does not designate any mode. The volume control key is used to allow the user to adjust the receiving speech volume. A power supply circuit 42 generates a desired operation voltage Vcc on the basis of an output from a battery 41 and applies the voltage Vcc to each circuit.

Figure 2:
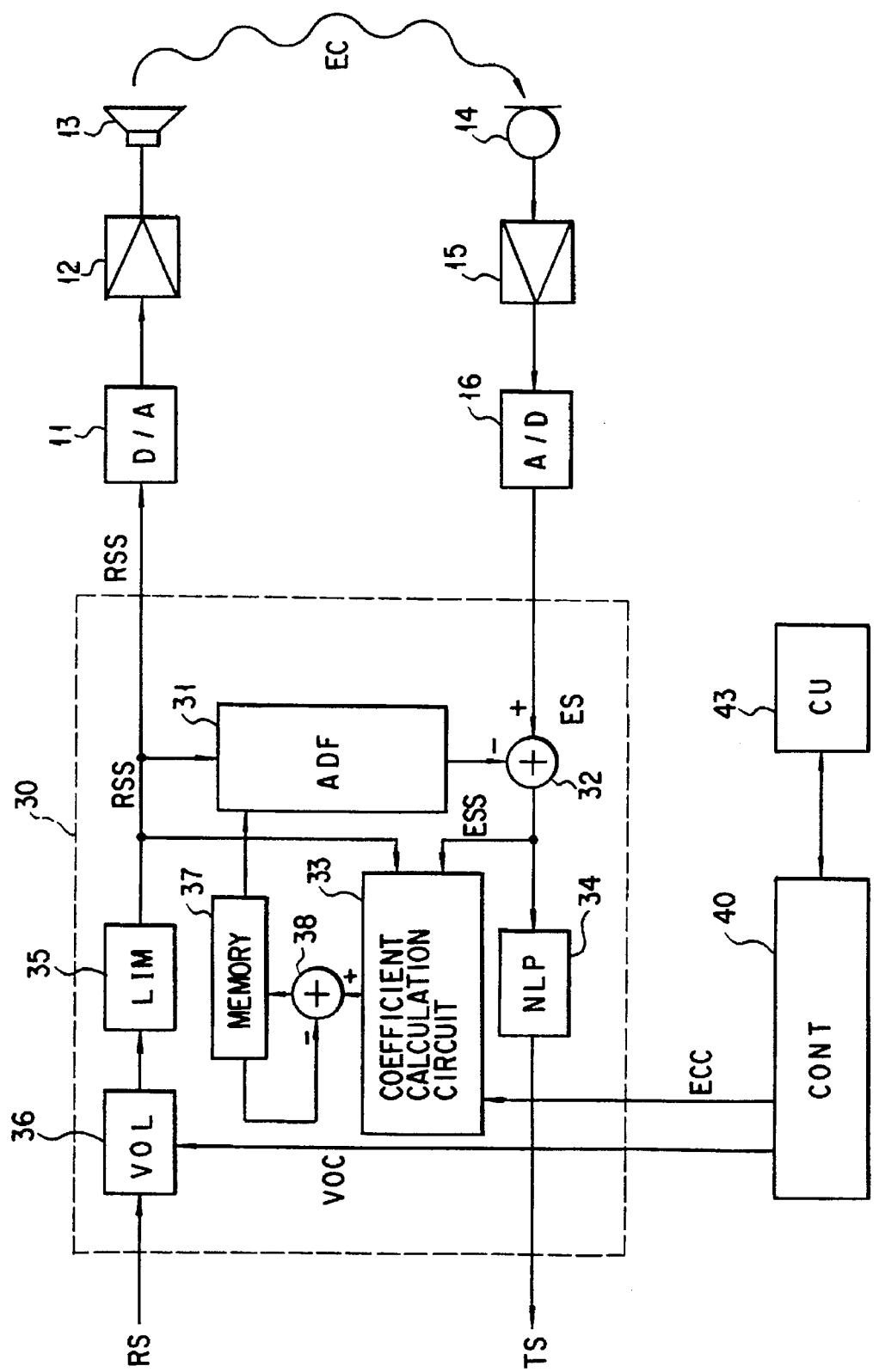
FIG. 2 is a circuit block diagram showing the arrangement of an echo canceler of a radio telephone apparatus shown in FIG. 1.

The details of the echo canceler 30 will be described below. FIG. 2 is a circuit block diagram showing its arrangement together with peripheral circuits. The echo canceler 30 is constituted by, e.g., a DSP (Digital signal processor). The DSP is functionally divided into an adaptive filter (ADF) 31, a subtracter 32, a coefficient calculation circuit 33 for calculating the coefficient of the filter 31, a coefficient storage memory 37, a coefficient updating subtracter 38, a nonlinear circuit (NLP) 34, an amplitude limiter (LIM) 35, and a volume control (VOL) 36.

The receiving speech signal RS is supplied to the amplitude limiter 35 through the volume control 36. The volume control 36 changes the level of the receiving speech signal RS by a level corresponding to a volume control signal VOC output from the control circuit 40 in accordance with a volume designation signal from the console unit 43. The amplitude limiter 35 limits the amplitude level of the receiving speech signal RS to a predetermined amplitude. That is, an amplitude having a value exceeding the predetermined value is limited to the predetermined value. This amplitude limit level value is set such that the amplitude level of the receiving speech signal does not exceed the dynamic ranges of the receiving speech amplifier 12 and the loudspeaker 13. An output RSS from the amplitude limiter 35 is supplied to the adaptive filter 31 and the D/A converter 11.

An acoustic echo signal ES generated when a receiving speech signal output from the loudspeaker 13 is input to the microphone 14 is input to the echo canceler 30 and is supplied to the positive input terminal of the subtracter 32. The adaptive filter 31 simulates the acoustic characteristics of an echo path from the loudspeaker to the microphone to generate a pseudo echo signal ESS. The pseudo echo signal ESS is supplied to the negative input terminal of the subtracter 32. The pseudo echo signal ESS may be supplied to the positive input terminal of the subtracter 32 and the acoustic echo signal ES may be supplied to the negative input terminal of the subtracter 32.

FIG. 3 is a detailed functional block diagram of the adaptive filter 31. The receiving speech signal RSS (=x(n)) is input to series-connected delay circuits (delay time is equal to one sampling period T) $52_1, 52_2, \ldots, 52_M$. An input speech signal x(n) and output signals x(n−1), x(n−2), ..., x(n−M) from the delay circuits are supplied to an adder 56 through amplifiers $54_0, 54_1, \ldots, 54_M$. Amplification coefficients $h_0, h_1, \ldots, h_M$ of the amplifiers $54_0, 54_1, \ldots, 54_M$ are supplied from the coefficient memory 37. These coefficients $h_0, h_1, \ldots, h_M$ are changed to allow a change in acoustic characteristics of an echo path to be simulated.

The output RSS from the amplitude limiter 35 and an output (residual signal) from the subtracter 32 are supplied to the coefficient calculation circuit 33. The coefficient calculation circuit 33 adaptively changes the coefficients for calculating the pseudo echo signal in such a manner that the residual signal is always set to zero. By this adaptive operation, the acoustic characteristics of a space to be used, i.e., an echo path are estimated. The pseudo echo signal EES is generated on the basis of this estimation result and the receiving speech signal RSS. The subtracter 32 performs an arithmetic operation process to subtract the pseudo echo signal EES from the echo signal ES, thereby canceling the echo signal ES.

The coefficients calculated by the coefficient calculation circuit 33 are supplied to the positive input terminal of the subtracter 38. The outputs from the subtracter 38 are written in the coefficient memory 37. Outputs from the memory 37 are supplied to the amplifiers $54_0, 54_1, \ldots, 54_M$ in the adaptive filter 31 as the amplification coefficients $h_0, h_1, \ldots, h_M$ and at the same time supplied to the negative input terminal of the subtracter 38.

The coefficient calculation circuit 33 determines a specific decrease in magnitude (amplitude) of each timing signal for the receiving speech signal RSS on the basis of the remaining echo level of each timing (time) signal from the corresponding residual signal. The coefficient calculation circuit 33 then determines the coefficients $h_0, h_1, \ldots, h_M$ on the basis of this determination result. Therefore, the coefficients fall within the range of the values from 0 to 1. After the coefficients are stored in the memory 37, they are supplied to the adaptive filter 31. For example, if a coefficient $h_i$ stored at a given timing "i" is 0.5, and the calculation circuit 33 outputs a coefficient of 0.3 at the next timing, the subtracter 38 obtains a difference of −0.2. The coefficient in the memory 37 is decreased by 0.2, and the coefficient is updated to 0.3. When the echo is completely canceled, the coefficient need not be changed, and the operation circuit 33 outputs the same coefficient as that at the previous timing.

Echoes are often generated in the hands-free speech mode but are rarely generated in the handset talking mode. Different coefficients of the adaptive filter 31 are used depending on different talking modes. Therefore, the coefficient memory 37 stores hands-free speech mode coefficients and handset talking mode coefficients independently of each other. A talking mode is set using the console unit 43. When the mode is switched from the hands-free speech mode to the handset talking mode, the coefficients used immediately preceding switching are set in the memory 37. When the hands-free speech mode is designated again, the coefficients stored in the memory 37 are read out and supplied to the adaptive filter 31.

An output from the subtracter 32 appears through the nonlinear circuit 34. The nonlinear circuit 34 forcibly nullifies a residual signal having a predetermined level or less and passing through the subtracter The operation of the echo canceler 30 arranged as described above will be described below. FIG. 4 is a graph showing the input/output characteristics of a circuit portion integrating the volume control 36 and the amplitude limiter 35. The amplitude limiter 35 limits the output level to a predetermined value. This predetermined value has a saturation level or less of the receiving speech amplifier 12. The volume control 36 is connected to the input of the amplitude limiter 35. Therefore, even if the level of the receiving speech signal RS is changed by the volume control 36 to perform volume control, as indicated by broken lines in FIG. 4, a signal output from the amplitude limiter 35 is level-limited to the predetermined level or less. Although the volume control 36 is appropriately adjusted, the amplitude level of the receiving speech signal RS input to the echo canceler 30 may be temporarily increased by an increase in transmitting speech volume of the partner or characteristic variations in transmission line. Even in this case, the amplitude level of the receiving speech signal RS is limited to a predetermined amplitude limit level or less by the amplitude limiter 35. Therefore, the receiving speech signal RSS whose amplitude level is limited is input to the adaptive filter 31 and the D/A converter 11. The amplitude level of the receiving speech signal RSS does not exceed the dynamic ranges at the receiving speech amplifier 12 and the loudspeaker 13. The received speech almost free from distortion can be amplified and output from the loudspeaker 13. Therefore, even if the acoustic echo EC of the received speech is picked up by the microphone 14 and appears as the echo signal ES on the transmitting speech signal path, an accurate adaptive operation is performed in the echo canceler 30 because the waveform of the echo signal ES is almost identical to that of the receiving speech signal RSS. The echo signal ES can be properly canceled by the echo canceler 30. In addition, even if a residual signal having a very low level is output from the subtracter 32, this residual signal can be properly eliminated by the nonlinear circuit 34. Therefore, a transmitting speech signal from which an echo signal component is effectively removed is supplied to the speech encoding/decoding circuit 9 or the analog audio circuit 20, thereby always allowing talking with high quality.

According to the first embodiment, the amplitude limiter 35 is arranged in the receiving speech signal input section in the echo canceler 30, and the amplitude level of a receiving speech signal is limited to a predetermined level or less by the amplitude limiter 35. Even if the amplitude level of the receiving speech signal RS input to the echo canceler 30 is increased due to too high a volume set by the volume control 36, an increase in transmitting speech volume of the partner and characteristic variations in the transmission line, the receiving speech signal RSS whose amplitude level is limited not to exceed the dynamic ranges of the receiving speech amplifier 12 and the loudspeaker 13 can be input thereto. Therefore, received speech free from distortion with excellent tone quality can be amplified and output. The echo canceler 30 is effectively operated to sufficiently cancel the acoustic echo, thereby allowing talking with high quality. In addition, the nonlinear circuit 34 is arranged in the transmitting speech signal output section in the echo canceler 30. Therefore, even if the residual signal having a very low level is output from the echo canceler 30, the residual signal can be properly eliminated by the nonlinear circuit 34. A transmitting speech signal from which an echo signal component is effectively removed can be supplied to the speech encoding/decoding circuit 9 or the analog audio circuit 20. The echo canceler 30 can be effectively operated to sufficiently cancel the acoustic echo component, thereby enabling talking with high quality.

In the first embodiment, the volume control level of the volume control 36 is directly and variably set from the external control circuit 40. However, a plurality of volume control level values may be prestored in a program ROM of the DSP constituting the echo canceler 30, and the control circuit 40 may access this program ROM to selectively read out a volume control level value corresponding to the operation of the volume control key, thereby supplying the readout value to the volume control 36.

Figure 5:
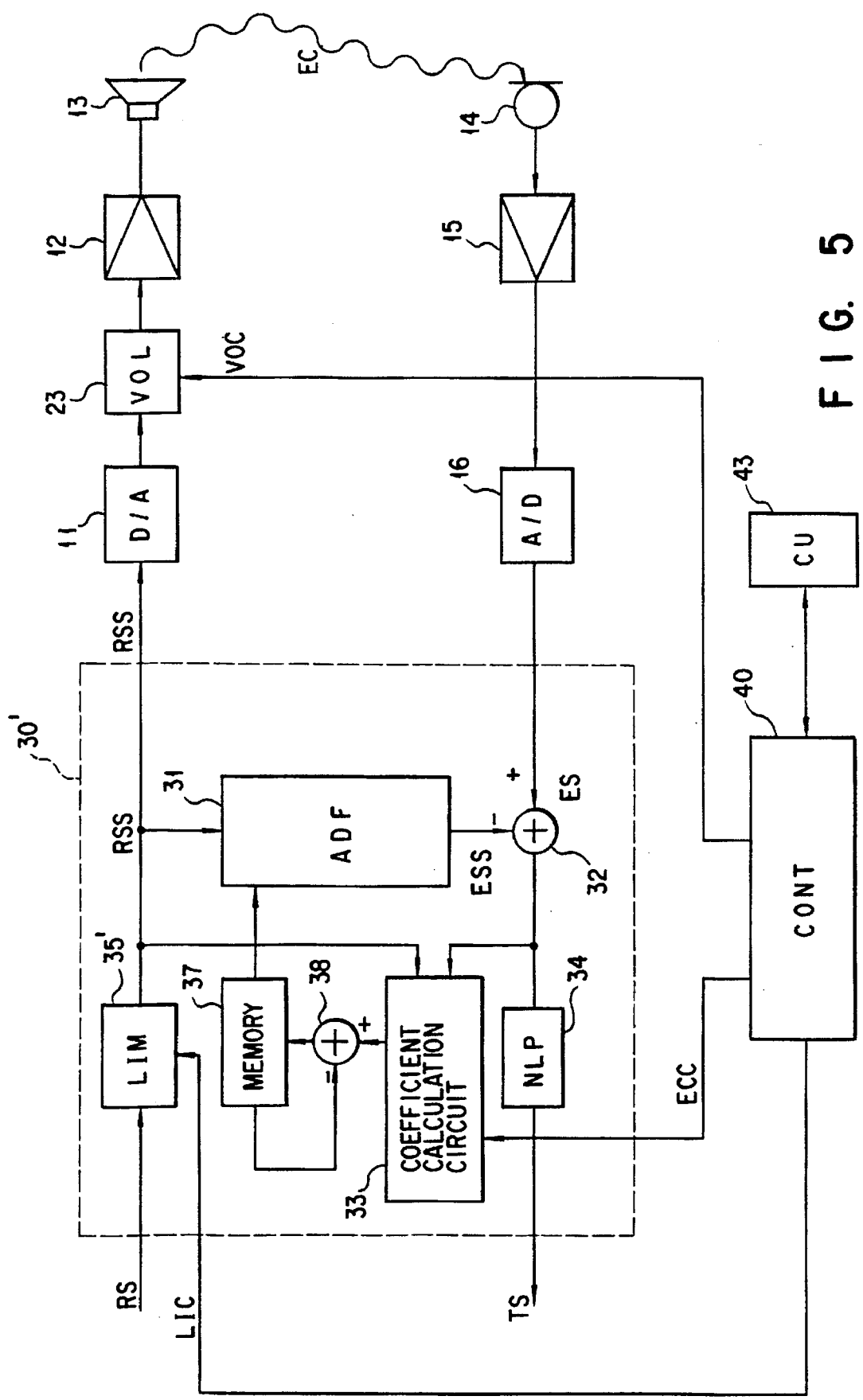
FIG. 5 is a circuit block diagram showing the arrangement of an echo canceler in a dual mode radio telephone apparatus according to a second embodiment of the present invention.

In the first embodiment, the amplitude limiter 35 is connected to the output of the volume control 36. However, the connection order may be reversed. For example, an amplitude limiter 35' may be connected to an adaptive filter 31 in an echo canceler 30', and an analog volume control 23 may be arranged between a D/A converter 11 and a receiving speech amplifier 12, as will be described as the second embodiment. As shown in FIG. 5, the volume control 23 comprises a variable resistor which is inserted in a receiving speech signal path and whose signal attenuation amount is variable. The resistance of the variable resistor is controlled by a volume control signal VOC from a control circuit 40. Alternatively, the volume control 23 may comprise an ON/OFF switch which is turned on/off at a very high speed. The duty ratio of this switch may be changed in accordance with the volume control signal VOC to change the volume. The control signal VOC from the control circuit 40 is variably set in accordance with an operation using a volume control key on a console unit 43. In the first embodiment, the limit level of the amplitude limiter 35 can be a predetermined level. However, in the second embodiment, the amplitude limit level must be set variable in accordance with the volume control level because the volume of the amplitude-limited receiving speech signal can be further controlled by the volume control 23. Therefore, a limit level control signal LIC is also supplied from the control circuit 40 to the amplitude limiter 35'. The limit level control signal LIC is also set variable in accordance with an operation of the volume control key of the console unit 43. The remaining arrangement of the second embodiment is the same as the first embodiment. The same reference numerals as in the first embodiment denote the same parts in the second embodiment, and a detailed description thereof will be omitted.

An operation according to the present invention will be described below. Assume the limit level and volume control level of the limiter 35' are set, as indicated by a solid line in FIG. 6A. FIGS. 6A, 6B, 7A, and 7B are graphs showing the input/output characteristics of the circuit portion integrating the amplitude limiter 35' and the volume control 23 like in FIG. 4. This limit level is a saturation level or less of the receiving speech amplifier 12. In this state, assume that a speaker operates the volume control key so as to increase the receiving speech volume. In this case, the volume control signal VOC for reducing the resistance is supplied from the control circuit 40 to the volume control 23, thereby reducing the resistance of the volume control 23. The amplitude level of a receiving speech signal RSS input to the receiving speech amplifier 12 is then increased, as indicated by the broken line in FIG. 6A. As a result, the volume of the received speech output from the loudspeaker 13 is increased. When an increase designation amount of the received speech which is designated by the volume control key is excessively large, the amplitude level of the receiving speech signal RSS input to the receiving speech amplifier 12 is greatly increased, and the amplitude level may greatly exceed the dynamic ranges of the receiving speech amplifier 12 and the loudspeaker 13. When the amplitude level of the receiving speech signal RSS exceeds the dynamic ranges of the receiving speech amplifier 12 and the loudspeaker 13, the received speech is distorted, and the echo canceler 30' cannot sufficiently cancel this echo signal.

According to this embodiment, when an operation for increasing the receiving speech volume with the volume control key is performed, the amplitude limit level control signal LIC for reducing the amplitude limit level value of the amplitude limiter 35' is output from the control circuit 40. The amplitude limit level value of the amplitude limiter 35' is reduced, as indicated by a solid line in FIG. 6B. Therefore, the receiving speech signal RSS whose amplitude level is limited to a smaller value by the amplitude limiter 35 is supplied to the volume control 23. Even if the resistance of the volume control 23 is variably set to a smaller value, as described above, an output signal from the volume control 23 is amplitude-limited to the saturation level or less of the receiving speech amplifier 12, as indicated by the broken line in FIG. 6B. The amplitude level of the receiving speech signal input to the receiving speech amplifier 12 and the loudspeaker 13 does not exceed the dynamic ranges of the receiving speech amplifier 12 and the loudspeaker 13, thereby preventing distortion of the received speech. Therefore, the echo signal component of the received speech can be sufficiently canceled by the echo canceler 30' free from the variable operation of the volume control 23, thereby always canceling the echo signal and allowing talking with high quality.

To the contrary, as indicated by a broken line in FIG. 7A, when a key operation is performed to reduce the receiving speech volume to a medium or low level with the volume control key, the amplitude limit level control signal LIC for increasing the amplitude limit level value is supplied from the control circuit 40 to the amplitude limiter 35'. Therefore, the amplitude limit level value of the amplitude limiter 35' is increased to a medium or high value, as indicated by a broken line in FIG. 7B. Therefore, the receiving speech signal RSS whose amplitude level is set to a larger value by the amplitude limiter 35' is supplied to the volume control 23. As described above, even if the resistance of the volume control 23 is set to a large value, the amplitude level of the receiving speech signal input to the receiving speech amplifier 12 and the loudspeaker 13 will not be excessively reduced, and the received speech is output from the loudspeaker 13 at an appropriate volume without any distortion.

According to the second embodiment, regardless of the receiving speech volume control operation, a receiving speech signal always having a predetermined volume is input to the echo canceler 30'. Therefore, the acoustic echo canceling effect by the echo canceler 30' can always be maintained at a sufficiently high level.

In the second embodiment, the amplitude limit level of the amplitude limiter 35' is directly set variable from the external control circuit 40. However, a plurality of amplitude limit level values may be prestored in a program ROM of a DSP constituting the echo canceler 30', and the control circuit 40 may access this program 10 ROM to selectively read out an amplitude limit level value corresponding to an operation of the volume control key, thereby supplying the readout amplitude limit level value to the amplitude limiter 35'.

Figure 8:
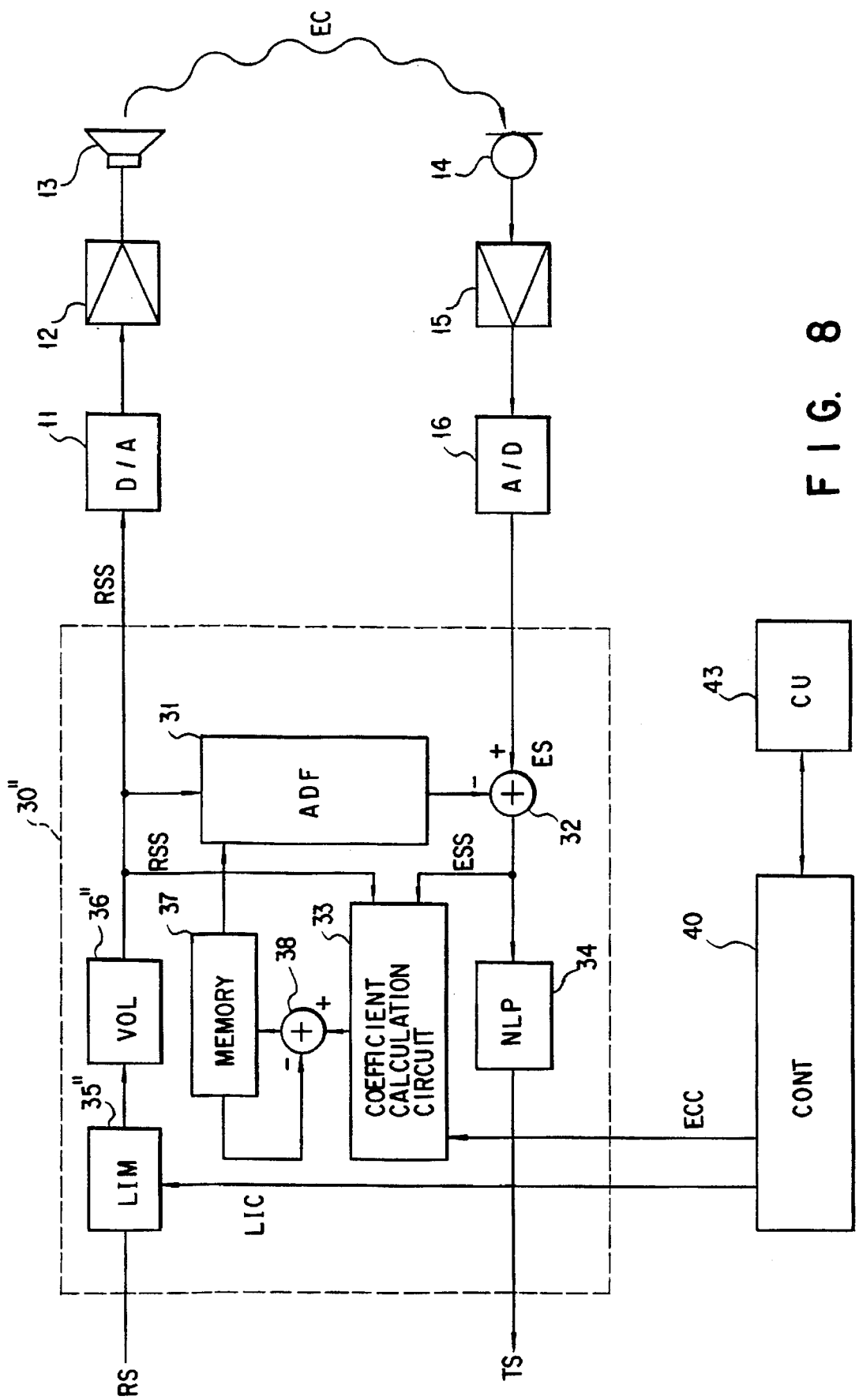
FIG. 8 is a circuit block diagram showing the arrangement of an echo canceler in a dual mode radio telephone apparatus according to a third embodiment of the present invention.

FIG. 8 is a circuit block diagram showing the arrangement of the main part of an echo canceler 30" according to the third embodiment. In the third embodiment, a digital volume control 36" is arranged in place of the analog volume control 23 of the second embodiment, and an amplitude limiter 35" and the volume control 36" are connected in series with each other to the input of an adaptive filter 31 in the echo canceler 30". The same effect as in the second embodiment can be obtained in this third embodiment. In the third embodiment, as in the second embodiment, the amplitude limit level of the amplitude limiter 35" and the volume control level of the volume control 36" are directly variably set from an external control circuit 40. However, a plurality of amplitude limit level values and a plurality of volume control level values may be prestored in a program ROM of a DSP constituting the echo canceler 30", and the control circuit 40 may access this process ROM to selectively read out an amplitude limit level value and a volume control level value which correspond to an operation of the volume control key, thereby supplying the readout amplitude limit and volume control level values to the amplitude limiter 35" and the volume control 36".

The present invention is not limited to the above embodiments, and various changes and modifications may be made. For example, the arrangement of an amplitude limiter, its connection location, the arrangement of an echo canceler, and the type and arrangement of a speech communication apparatus may be variously modified and changed without departing from the spirit and scope of the present invention. Each embodiment described above has exemplified a mobile telephone. However, the present invention is not limited to a radio speech communication apparatus, but can be equally applied to a wired telephone apparatus, a radio communication machine, a transceiver, and the like. An acoustic echo is generated not only in the hands-free speech mode, but also in the handset talking mode. The present invention is also applicable to the handset talking mode. In addition, the volume control and the amplitude limiter which are integrally formed with the DSP as the echo canceler have been exemplified. However, the volume control and the amplitude limiter may be arranged independently of the DSP.

Industrial Applicability

As has been described above, a speech communication apparatus according to the present invention comprises amplitude limiting means in a receiving speech signal path in addition to an echo canceler for canceling an acoustic echo generated when speech amplified and output from a loudspeaker means is input to a microphone means. By this amplitude limiting means, the signal level of the receiving speech signal is limited to a predetermined amplitude limit level or less before the signal is supplied to the echo canceler. Therefore, even if a receiving speech signal having a high signal level is input, the received speech will not be distorted, and the acoustic echo can always be sufficiently canceled by the echo canceler. The talking quality can be further improved. For example, even if the receiving speech signal level becomes high due to a high transmitting speech volume of a partner or characteristic variations of a transmission path, the amplitude level of the receiving speech signal is limited to a predetermined amplitude limit level or less by the amplitude limiting means, and the level-limited signal is input to the loudspeaker means, so that the receiving speech signal level always falls within the dynamic range of the loudspeaker means. Distortion of a received tone at the loudspeaker can be prevented, the echo canceler can always be sufficiently cancel the acoustic echo, and talking quality can be further improved.

When volume control means is connected to the output side of the amplitude limiting means, the amplitude limit level of the amplitude limiting means is set variable in accordance with the variable operation of the receiving speech signal level in the receiving speech volume control means. For example, when a speaker increases the receiving speech volume, the amplitude limiting level of the amplitude limiting means is decreased accordingly. Therefore, the receiving speech signal level will not exceed the dynamic range of the loudspeaker means even upon an operation for increasing the receiving speech volume. Distortion of the received speech can be properly prevented. Therefore, the acoustic echo canceling effect by the echo canceler can be always and highly maintained regardless of the operation for controlling the receiving speech volume.

We claim:

1. A speech communication apparatus, comprising:

transceiver means for transmitting and receiving a speech signal;

loudspeaker means for outputting a speech signal received by said transceiver means;

microphone means for inputting a speech signal to be transmitted;

means, connected between said loudspeaker means and said transceiver means and between said microphone means and said transceiver means, for canceling an acoustic echo generated upon inputting the received speech signal output from said loudspeaker means to said microphone means;

means for limiting, to a predetermined value, an amplitude of the received speech signal to means for limiting, to a predetermined value, an amplitude of the received speech signal to be input to said echo canceling means, when said amplitude exceeds the predetermined value;

means, connected to an output of said amplitude limiting means, for decreasing/increasing an amplitude of the received speech signal output from said amplitude limiting means: and means for decreasing/increasing the predetermined limit value in association with an increase/decrease of the amplitude of the received speech signal by said amplitude decreasing/increasing means.

2. The speech communication apparatus according to claim 1, wherein said echo canceling means comprises:

arithmetic operation means for arithmetically operating an input signal to said echo canceling means using a coefficient for simulating an acoustic characteristic of an echo path from said loudspeaker means to said microphone means, and generating a pseudo echo signal;

subtracting means for obtaining a difference between the speech signal input from said microphone means and an output of said arithmetic operation means; and means for adaptively changing the coefficient of said arithmetic operation means so that an output of said subtracting means becomes zero.

3. The speech communication apparatus according to claim 2, wherein said arithmetic operation means comprises:

a plurality of delay circuits for sequentially delaying an input signal to said echo canceling means;

a plurality of amplifiers for amplifying outputs of said delay circuits in accordance with the coefficients; and an adder for adding outputs of said amplifiers.

4. The speech communication apparatus according to claim 1, wherein said echo canceling means and said amplitude limiting means are comprised of a digital signal processor.

5. The speech communication apparatus according to claim 1, wherein:

said amplitude limiting means limits an amplitude level of the received speech signal to a predetermined value not exceeding a dynamic range of said loudspeaker means; and means for controlling a volume of the received speech is connected to an input side of said amplitude limiting means.

6. The speech communication apparatus according to claim 5, wherein said amplitude limiting means, said volume control means, and said echo canceling means are comprised of a digital signal processor.

7. The speech communication apparatus according to claim 1, wherein said amplitude limiting means limits the amplitude level of the received speech signal obtained upon volume control to a predetermined value falling within a dynamic range of said loudspeaker means.

8. The speech communication apparatus according to claim 1, wherein said echo canceling means and said amplitude limiting means are comprised of a digital signal processor, and said volume control means is connected to an output of said digital signal processor through a D/A converter.

9. The speech communication apparatus according to claim 1, wherein said echo canceling means, said amplitude limiting means, and said volume control means are comprised of a digital signal processor.

10. The speech communication apparatus according to claim 1, further comprising:

a nonlinear circuit for nullifying a signal having a value of not more than a predetermined value connected between said echo canceling means and said transceiver means.

11. The speech communication apparatus according to claim 1, wherein said speech communication apparatus is a mobile telephone apparatus having a hands-free transceiver means.

12. The speech communication apparatus according to claim 1, wherein said loudspeaker means and said microphone means comprise a hands-free speech speaker and a hands-free speech microphone, respectively.

13. The speech communication apparatus according to claim 1, wherein said speech communication apparatus is a dual mode mobile telephone apparatus having hands-free speech.

14. A speech communication apparatus, comprising:

a transceiver for transmitting and receiving a speech signal;

a loudspeaker for outputting a speech signal received by said transceiver;

a microphone for inputting a speech signal to be transmitted;

a canceling circuit connected between the loudspeaker and the transceiver and between the microphone and the transceiver, said canceling circuit canceling an acoustic echo generated upon inputting the received speech signal input from the loudspeaker to the microphone;

a limiter, said limiter limiting the amplitude of the received speech signal to be input to the canceling circuit to a predetermined value, when said amplitude exceeds the predetermined value;

a first circuit connected to and output of said limiter, said first circuit decreasing/increasing an amplifier of the received speech signal output from said limiter; and a second circuit, said second circuit decreasing/increasing the predetermined limit value in association with an increase/decrease of the amplitude of the received speech signal by said first circuit.

* * * * *